Oct. 26, 1971  E. H. SCHOLLMAIER ET AL  3,614,959
MEANS FOR CLEANING CONTACT LENSES OR THE LIKE
Filed March 24, 1969  3 Sheets-Sheet 1
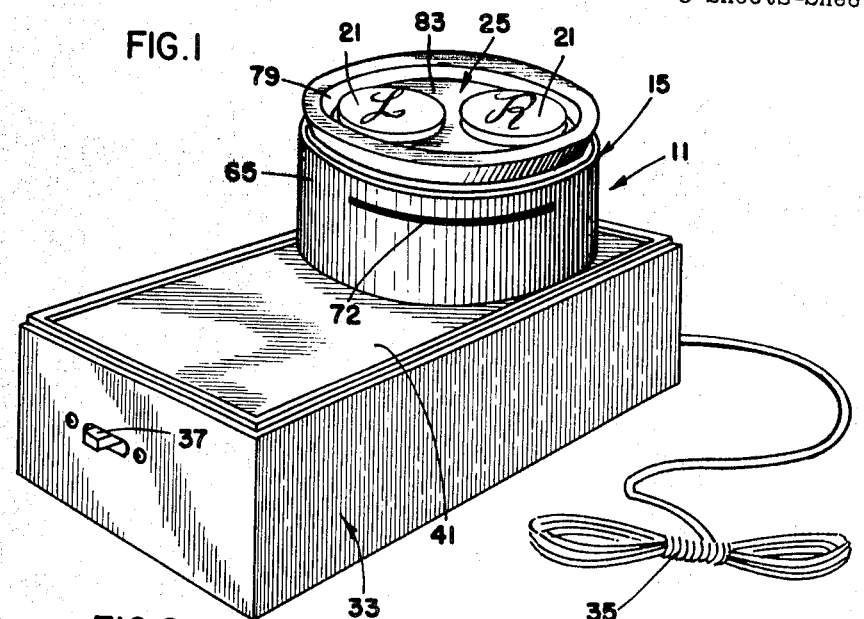
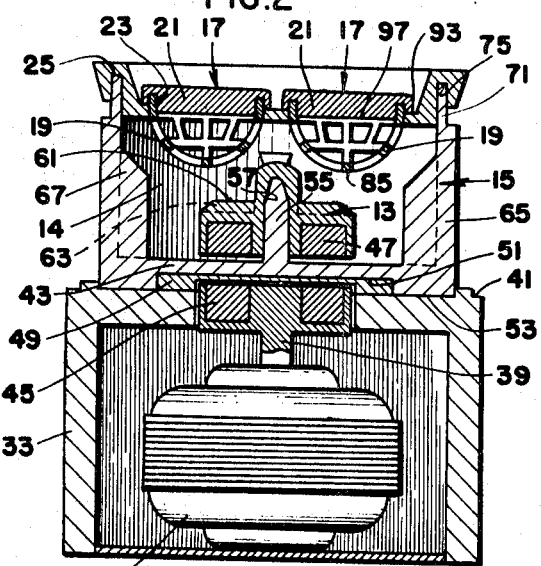
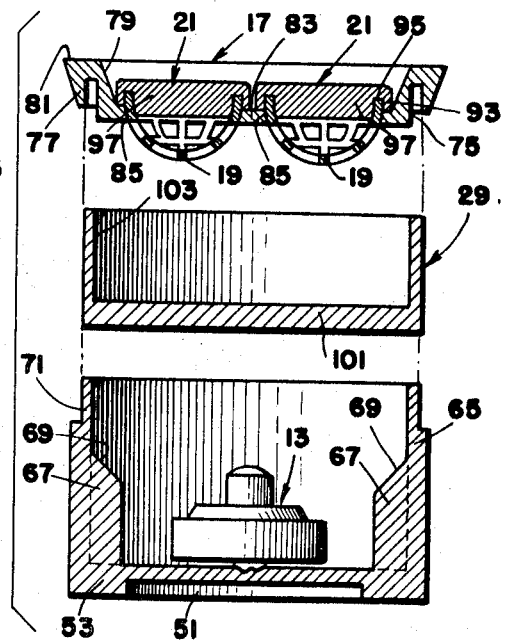
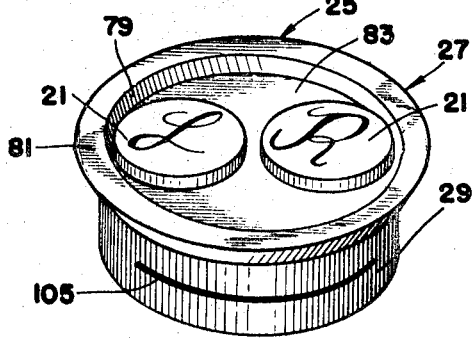
INVENTORS
EDGAR H. SCHOLLMAIER
NORMAN R. DEWAR
GERALD HECHT
ATTYS.

United States Patent Office 3,614,959
Patented Oct. 26, 1971

3,614,959
MEANS FOR CLEANING CONTACT LENSES
OR THE LIKE
Edgar H. Schollmaier, Norman R. Dewar, and Gerald Hecht, Fort Worth, Tex., assignors to Alcon Laboratories, Incorporated, Fort Worth, Tex.
Filed Mar. 24, 1969, Ser. No. 809,501
Int. Cl. B08b 3/06
U.S. Cl. 134—117                 7 Claims

ABSTRACT OF THE DISCLOSURE

A contact lens holder holds contact lenses suspended within a cleaning solution being agitated by a motor driven agitator within a cleaning container. The lens holder also fits interchangeably with a soaking container. The unit is compact, simple, low cost and of a construction which avoids liquid leakage problems.

This invention relates to a contact lens cleaning unit and, more particularly, to such a unit having a motor driven agitator for washing the lenses with a cleaning solution and to a soaking kit for soaking and storing the lenses after washing.

Commercially available contact lens cleaning units require that the person manually agitate the cleaning solution to obtain the necessary washing of the lenses. The cleaning solution is normally a soap or detergent, although it may be a germicidal solution. In any event, to obtain the intimate washing necessary for removal of foreign material from the lenses requires manual operations which may be quite time consuming and tiring with the result that persons tire before a sufficiently good job of washing or cleaning of the lenses is accomplished.

With the present invention, an intimate washing of very small, thin contact lenses by the cleaning solution is achieved by a motor driven agitation of the cleaning solution while the lenses are held in position for intimate washing without being scratched or otherwise damaged. Also of importance is a cleaning unit which will not spill or leak the cleaning solution and is constructed without the use of expensive waterproof seals. Another important consideration for a commercially practical unit is that it be small, lightweight and low cost. To allow the contact lens wearer to maintain the lenses moist and in a soaking solution, it is also desirable to provide a contact lens storage unit which is usable with the lens holder of the lens cleaning unit, permitting cleaning and storage of the lens without tactile contact.

The motor driven contact lens cleaning unit comprises a container having an opening in a hollow chamber for receiving a cleansing liquid therein. A lens holder preferably including a pair of perforated baskets is suspended from the lens holder. During cleansing, a cap means covers said baskets and a motor drive means is provided to mechanically agitate the liquid in the container. A soaking container having a further chamber may be provided for receiving the lens holder and the lenses and for soaking the latter. The lens holder is engaged by and supported on the soaking chamber during soaking.

A general object of the present invention is to provide a convenient, compact and easy to use motor driven contact lens cleaning unit.

A further object of the invention is to provide a soaking kit which is readily usable with a portion of the lens cleaning unit to soak the lenses.

These and other objects of the invention will become apparent from the following detailed description from the drawings in which:

FIG. 1 is a perspective of a lens cleaning unit embodying the features of the invention;

FIG. 2 is a cross-sectional view of the unit shown in FIG. 1;

FIG. 3 is a perspective view of a soaking kit;

FIG. 4 is an exploded sectional view showing a lid which is usable with either a soaking container or a lens cleaning container;

Figure 5:
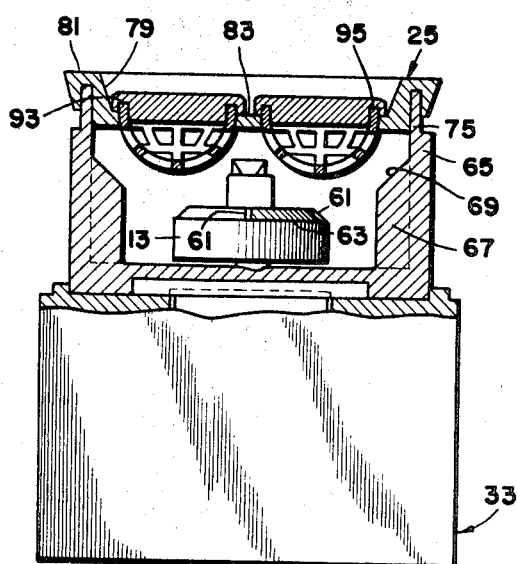
FIG. 5 illustrates another embodiment of a contact lens cleaning unit.

Very generally, as shown in the drawings for purposes of illustration, the invention is embodied in a cleaning unit 11 having a motor driven agitator 13 for agitating a cleaning solution disposed within a chamber 14 of a container 15 to scrub and wash foreign mater from contact lenses without otherwise scratching or damaging the same. The very thin and quite small contact lenses are held suspended within the cleansing solution and protected against undue movement, preventing scratching or otherwise damaging thereof, by a pair of lens holders 17 in the form of perforated baskets 19 which project into the cleansing fluid disposed in the hollow chamber 14 of the container 15. To facilitate placing the contact lenses in position for washing or a removal or inspection thereof, the lens holding baskets 19 are accessible from the exterior of the contact lens cleaning unit 11 upon removal of caps 21 which cover the access openings 23 at the tops of the baskets. Preferably, the lens holding baskets 19 are suspended from openings in a lens holding disc or lid 25 for the open end of the container 15. To facilitate transfer of the lenses after washing to a soaking unit 27 (FIG. 3) with a minimum of tactile handling of the lenses, the lens holding lid 25 also is constructed for suitable attachment to a soaking kit container 29 holding a soaking solution such as water or a germicidal solution.

Referring now with greater detail to the preferred embodiment of the invention illustrated in FIGS. 1–4, an electric motor 31 is housed within a base or housing 33 of generally rectangular and box-shaped configuration. The housing may be quite small, e.g., 5 inches long, 2 inches in height and 3 inches in width, and is adapted to be placed on a suitable support or table. An electrical conductor 35 is attached to the motor and a suitable on-off switch 37 is provided on the housing to selectively control energization of the electric motor. As best seen in FIG. 2, the electrical motor is positioned in the housing with its output shaft 39 upstanding for coupling to the agitator 13 which is disposed within the container 15 mounted on a top wall 41 of the housing.

As the cleaning unit may be placed on a table, cabinet or other furniture piece, it is of importance that there be no leaking of the cleaning solution or the spilling thereof. To these ends, the container 15 is separable from the housing 33 and may be filled at a remote and safe location and then placed in position on the housing. It is preferred that the container have an imperforate, solid bottom wall 43 without a protruding shaft or mechanical coupling through it which would have to be sealed. Waterproof seals and/or bearings for the agitator are expensive and subject to failing.

In the preferred embodiment of the invention, the driving and coupling between the motor shaft 39 and the agitator 13 is through a magnetic coupling device which includes a driving magnet 45 fixed to the end of the motor output shaft 39 and a driven magnet 47 connected to or comprising the agitator. As illustrated, magnets 45, 47 may be annular in shape, and the driven magnet may be fixed to the bottom side of the agitator 13. When the motor 31 is energized, the respective annular magnets 45, 47 will by means of the magnetic attraction therebetween be held in a coupled relationship whereby rotation of the motor shaft 39 and driving magnet 45 causes rotation of the driven magnet 47 and the agitator 13 and results in the agitation of a cleaning solution in the chamber 14 of the container 15.

To position the container 15 and the agitator 13 in aligned and driving relationship to the motor 31 and driving magnet 45, a locator 49 (FIG. 2) is provided on the housing 33 for positional engagement with the container. In this instance, the locator is in the form of a disc fixed to and projecting above the top wall 41 of the housing. The preferred disc is formed of a plastic material which will not interfere with the magnet coupling between the driving magnet and driven magnet. Cooperating with the locator disc is a groove or seat 51 of circular shape formed in the bottom wall 43 of the container. The circular disc and seat are complementary in size and depth, and when locating the container in position, the perimeter 53 of the container bottom walls rests on the housing top wall 41. The locator disc is disposed coaxially with the axis of the motor shaft 39 and the driving magnet 45 and likewise the seat 51 in the container is also disposed coaxially with the axis of rotation of the driven magnet and the agitator 13. Thus, when the container is seated over the locator disc, the respective annular driving and driven magnets are aligned coaxially with the axis of rotation of the driving motor and the agitator. The locator disc 49 also completely seals the motor from above so that no direct access to the electrical drive system is possible. This is a safety feature to prevent electrical short circuit should accidental spillage of the cleaning solution occur.

A low cost and simple mounting means for supporting the agitator 13 for rotational movement is provided in the form of an upstanding post 55 (FIG. 2) fixed to the bottom container wall 43 and a post receiving socket 57 formed in the agitator. The top end of the post 55 is bullet shaped, that is, tapered to a rounded nose to provide a bearing surface, and fits into the upper end of the socket 57 which is correspondingly tapered to provide a loose, spaced fit on the tip of the post. Both the post 55 and the cylindrical portion of the agitator in which the socket 57 is formed are made of a molded plastic having a low friction characteristic. The rounded bearing contact between the agitator and the post allows the agitator to turn easily and to center itself on the post 55 during its rotational movement. An annular groove in the bottom wall of the agitator contains the annular driven magnet 47. The top of the agitator 13 is formed with four equally spaced agitator blades 61 which project upwardly from a top surface 63 of the agitator body. Each of the four agitator blades are generally pointed at their radially outer ends, and have a generally scalloped relationship with adjacent blades which provides a four pointed star appearance to the agitator when viewed from above.

The container 15 is preferably formed by molding a plastic material which is transparent, lightweight and resistant to the cleaning solution. Preferably, the container 15 is formed in the shape of a cylindrical dish or cup having a cylindrical upstanding wall 65 integrally attached to the bottom wall 43. A suitable size of container measures 2½ inches in diameter and 1½ inches in height. To assure turbulence for a good intimate cleaning and washing of the lenses, the interior side of the circular wall of the container is provided with a series of vanes 67 to cause increased turbulence in the fluid being agitated by the rotating agitator 13. The preferred vanes are four in number and have a triangular cross section and extend upwardly from the bottom wall 43 to an inclined top wall 69, as best seen in FIGS. 2 and 4. The top of the container is open and thereat the container wall 65 is formed with a reduced cross section to function as a sealing flange 71 for sealing fit and interconnection with the lid 25.

To obtain the desired concentration and at least a minimum level of cleaning solution for assuring that the lenses within the baskets 19 will be immersed, an indicator or indicia means in the form of an arcuate line 72 is provided on the exterior of the transparent container wall 65. Thus, the user will fill the container at least to this line 72 and, when the lid 25 is attached, the lenses in the baskets will be immersed for washing both sides of the lenses.

The lens holding lid or disc 25 serves as a waterproof lid or cover for the open upper end of the cleaning container 15, when attached thereto, and also serves as a lid or cover for the open mouth of the soaking container 29 (FIGS. 3 and 4) when attached thereto. The lid in this instance is quite large and permits easy filling of either the soaking container 29 or the washing container 15. Also, the lid serves as a holder for the lens baskets and permits transfer of the lenses from the cleaning solution container to the soaking container without contact by the hands. The preferred lid is dish-shaped and molded from a flexible plastic material. The flexible plastic allows portions of the lid to be flexed and forced into a sealed gripping engagement with the container flange 71 and yet be readily peeled therefrom to expose the interior of the chamber. In this instance, the lid seals with the respective containers 15 and 29 by means of an annular sealing groove 75 formed in the underside of the lid adjacent the outer peripheral edge thereof. When the sealing flange 71 of the washing container 15 is projected into the sealing groove 75, there is provided a waterproof seal against the loss of liquid from the chamber during the washing operation. To assist in peeling the lid, and outer rim wall 77 on the lid is formed with a reduced cross section in the downward direction thereby reducing its stiffness. The dish-shaped configuration for the lid results from an annular inclined wall 79 extending from the top rim wall 81 for the cover to a generally circular lower wall 83 in which are formed circular openings 85 through which project the baskets 19.

Figure 8:
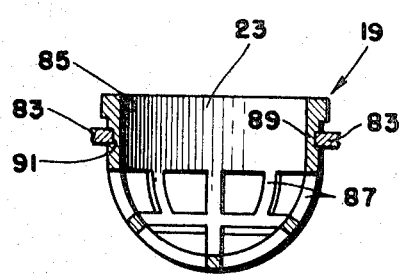
FIG. 8 is an enlarged, fragmentary, sectional view of a lens holder.

The illustrated baskets 19 are formed of a molded flexible plastic and have inner dimensions which will permit insertion of the contact lens therein and holds the same in position to allow the cleaning fluid to flow through the basket and have intimate washing contact with the lens. As best seen in FIG. 8, the baskets 19 have a lower hemispherical shaped portion formed by a series of spaced ribs 87 joined in a rounded lattice and between the ribs are openings which allow the fluid to flow over and beneath the lens positioned in the interior of the basket. The illustrated baskets have an upper cylindrical portion 89 integrally attached to the hemispherical, ribbed portion. A circular groove 91 is formed in the outside wall of this cylindrical portion and has a snap fit relationship with the edge of the opening 85 in the circular lid wall 83 whereby the basket is suspended in this lid opening and has a waterproof sealed relationship thereto. As an alternative to the separately formed baskets, it is possible to mold the baskets integrally with the lid and thereby assure the same waterproof connection therebetween.

The top of the cylindrical portion 89 of each lens holder basket 19 projects above the plane of the circular lid wall 83 with the access opening 23 disposed above the latter and providing access to the interior of each basket whereby lenses may be inserted or removed. During either a washing or soaking operation, it is preferred to cover the access openings 23 by the caps 21 which respectively have indicia L and R thereon indicating that the left lens is beneath the L cap and that the right lens is beneath the R cap. The preferred caps have generally cylindrically shaped, molded, plastic bodies with an outer, flat circular surface from which depends an outer flange 93 (FIG. 4) spaced by an annular groove 95 from an inner circular projection or stop 97. The cap is attached to the basket by pushing the cap on the top of the basket and inserting the top of the basket into the annular sealing groove 95.

To prevent upward movement of the lenses within the baskets 17 to positions above the bottom surface of the lid and thereby out of intimate contact with the cleaning solution on upper sides of the lens, the stop 97 on the cap projects downwardly into the basket to a position substantially coplanar with the underside of the lid circular wall 83. The upper peripheral edges of the caps may be provided with a tab or shoulder whereby the caps may be gripped or peeled from the holders to permit access to the interior of the baskets.

The illustrated soaking container is an open topped dish-shaped container 29, preferably formed from a transparent plastic material, having a bottom wall 101 (FIG. 4) integrally joined to an upstanding circular wall 103. The circular wall 103 has a diameter and thickness to project its upper edge into sealing relationship with the groove 75 in the lid 25 when the lid 25 is placed on the container 29. A suitable indicator or indicia means 105 is provided on the exterior of the circular wall 103 (FIG. 3) to aid in filling the container 29 to the desired level.

Another embodiment of the invention is illustrated in FIG. 5 wherein a battery holder 109 is attached to the base 33 and contains batteries which provide the electrical power for driving an electrical motor which is magnetically coupled to the agitator 13. Except for the battery power source and its connection to an electric motor, the cleaning unit shown in FIG. 5 is identical to that described above and shown in FIGS. 1 and 2.

Figure 6:
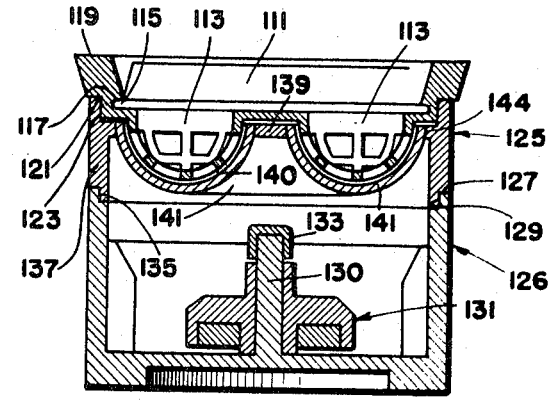
FIG. 6 is a sectional view of another embodiment of the invention showing a nested cleaning chamber, soaking chamber and lid.

As illustrated in the embodiment shown in FIG. 6, a soaking container may be seated, as for storing, on a cleaning container. In this embodiment, a large circular cap 111 covers both lens holding baskets 113. An annular peripheral rib 115 on the cap 111 snap fits into a groove 117 in a lid 119. The lens holder or lid 119 functions in a manner substantially similar to that described above for the lid 25. In lieu of the sealing groove 75 formed in the lid 25, the lid 119 is provided with a pair of sealing surfaces 121 and 123 for sealing against a top wall and an interior cylindrical wall in either a soaking container 125 or cleaning container 126. More specifically, the cleaning container 126 has an upper rim wall 127 for abutting against the lid sealing wall 121 and has an annular rim wall 129 for abutting in sealing engagement with the annular wall 123 on the lid 119. The cleaning container 126 is generally identical in construction and usage to the container 15 described in connection with the embodiment of FIGS. 1–4. The container 126 embodies a generally cylindrical agitator mounting post 130 which projects through an agitator 131 to receive a cap 133 which holds the agitator against axial sliding off the mounting post. The agitator 131 includes an annular shaped magnet for magnetic coupling to a driving magnet in the housing (not shown), as described herein.

The soaking container 125 is shown nested on the cleaning container and is held thereon by its lower flange 135 fitted against the cleaning container walls 129 and 127. In this instance, a generally cylindrical wall 137 for the container 125 bounds and is integrally connected to its circular bottom wall 139 which has an annular groove or channel 140 extending downwardly sufficiently to permit the lens baskets 113 to be inserted therein. The groove 140 is defined by a wall 141 which is spaced from and disposed beneath the baskets and holds the soaking solution which flows through the openings in the baskets to contact the lenses. When the rib 115 on the cap 111 is fitted into the groove 117 in the lid 119, the soaking solution is sealed from movement through the baskets in case the soaking container is tipped over. The lid 119 is used with either the cleaning container 126 or with the soaking container 125 much in the manner previously described except that with removal of the single cap 111 both of the baskets 113 are exposed.

Figure 7:
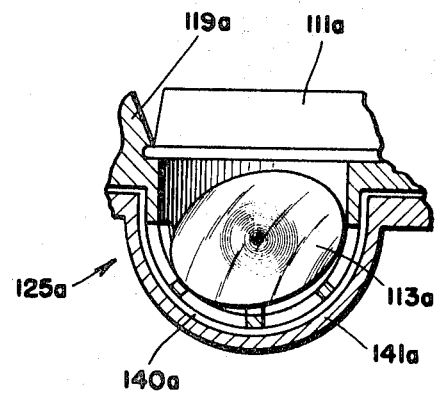
FIG. 7 is a fragmentary sectional view of the cleaning unit of FIG. 6 adapted for cleaning an artificial eye.

While the invention has been described herein as in connection with the cleaning of contact lenses, it is also possible by slight adaptation of the holder basket to receive and clean artificial eyes. In this instance, the artificial eye is disposed in a basket 113a (FIG. 7) similar to the basket 113 in FIG. 6 and is carried by a lens holder or lid 119a which is generally similar to the lid 119 illustrated in FIG. 6. However, the basket 113a is much larger in size and only a single basket is provided. The basket 113a and artificial eye are shown in connection with a soaking unit 125a which can be generally similar to the soaking container 125 described above in connection with FIG. 6. Although not shown, it is to be understood that the cleaning cartridge, agitator and motor drive may be also similar to those hereinbefore described.

Figure 11:
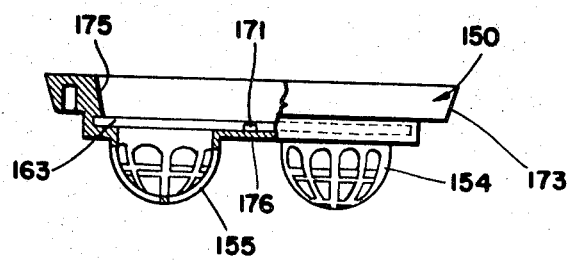
FIGS. 10 and 11 illustrate a turnable cap for the lid of FIG. 9.
Figure 9:
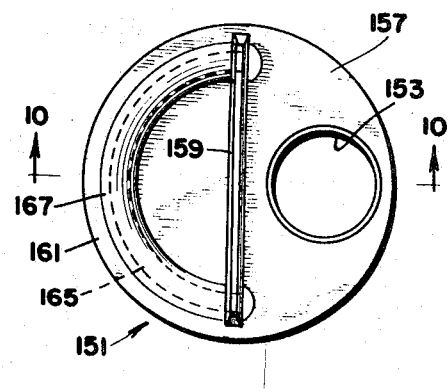
FIG. 9 illustrates another embodiment of a lid.
Figure 10:
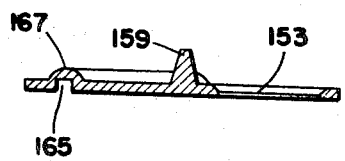

In accordance with a further embodiment of the invention illustrated in FIGS. 9, 10 and 11, a container having a motor driven agitator may be provided with a holder including a lid 150 (FIG. 11) in which may be mounted a turnable cap 151 (FIGS. 9 and 10) having a circular access opening 153 which may be turned into an aligned position over a right or left lens basket 154 or 155 to permit a contact lens to be inserted or removed from the aligned lens holding basket. When the cap 151 is turned to a position in which its access opening 153 is intermediate the two lens holding baskets 154 and 155, portions of an imperforate wall 157 of the cap cover both of the lens baskets and seal the same against a loss of the cleaning solution therefrom.

As best seen in FIGS. 9 and 10, the turnable cap 151 is generally circular in shape and is provided with an upstanding centrally located rib 159 which is adapted to be grasped between a thumb and forefinger when turning the cap about an axis through the center of the lid 150. The cap is generally disc shaped and made of a molded plastic such as nylon. A peripheral rim 161 for the cap 151 is seated in an annular groove 163 in the lid 150 for turning about an axis through the center of the lid. The access opening 153 in the cap is of the same size as each of the openings for the baskets 154 and 155, and it is located at the same radial distance from the center of the lid as are the respective lens holding baskets.

It is preferred that the turning movement of the cap 151 be limited to 180° and that a turning movement in one direction be required to align its access opening 153 over the lens basket 154 and a turning in the opposite direction be required to align the access opening 153 in position over the other lens holding basket 155. To these ends, the underside of the cap is formed with an upwardly extending groove 165 which extends for 180° and projects into a thickened bead 167 on the cap. The groove 165 receives an upstanding stop pin 171 which is integrally molded on the lid 150. In this instance, the stop pin 171 is a small, generally cylindrical protuberance with a flat top, the pin being sized to slide freely in the groove 165 until it abuts an end wall for the groove. The end walls of the groove 165 are located at positions substantially beneath the ends of the upstanding rib 159. In this instance, the stop pin is located at a position 90° from each of the lens holding baskets 154 and 155 and the access opening in the cap is located 90° from the end walls of the groove which receives the stop pin. Thus, a 90° cap movement from a centered covering position will uncover one lens holding basket and 180° turning in the reverse direction will uncover the other basket. The lid 150 is preferably formed of a flexible, plastic material, such as polyethylene, which allows the lid to be bent as its outer, inclined rim wall 173 is lifted from engagement with the container 15 to expose its hollow interior. The lens holding baskets 154 and 155 are integrally molded and attached to a central, flat wall 176 for the lid. The cap receiving groove 163 is annular in shape and is disposed within an interior inclined side wall 175 and opens inwardly in a plane immediately above the central wall 176 from which the baskets are suspended. The cap receiving groove 163 receives the peripheral edges of the cap which is formed of a suitable cross-sectional thickness and diameter to snap or slide within the groove and to remain captured therein while still having a free and easy sliding movement relative to a stationary lid.

As an aid to understanding the invention, a brief description of a manner of operation will be described in connection with the embodiment of FIGS. 1-5. The agitator 13, if removed from the cleaning container, is placed on the upstanding shaft 55. The cleaning chamber is filled with water to the indicia level indicated by the line 72 and several drops of cleaning solution are added to provide the proper concentration and liquid level for cleaning the lenses in the baskets 17. The lid or lens holder disc is secured on the top of the filled cleaning chamber. The caps 21 on the lens basket 19 are removed to expose the access openings to the interior of the lens baskets. The right contact lens is placed in a basket and then covered by the cap 21 with the letter R thereon, and the left contact lens is placed in the other basket and covered by the cap 21 having the letter L thereon.

In the preferred unit, the electrical conductor 35 is connected to a 110 volt AC current source and the switch 37 is moved to the "on" position. The motor 31 energizes and turns its shaft 39 and driving magnet 45 which turns the driven magnet 47 and causes the agitator 13 to turn within the chamber. The cleaning solution become turbulent as a result of rotation with the agitator and the movement of the cleaning solution relative to the fixed vanes 67 in the chamber. The cleaning solution moves through the openings in the baskets 19 to wash both sides of the contact lens. Usually one minute of washing is sufficient to clean the lenses.

After washing, the lens holder lid having the lenses in the baskets is removed from the cleaning chamber 15 and the lenses are rinsed under cool tap water. A soaking solution is added to the soaking container 29 to the level indicated on it by the indicia 105. The lid is then snapped on the top soaking chamber 29 to allow the lenses to soak, which is often an overnight procedure. The used cleaning solution is discarded and the cleaning chamber and agitator are rinsed in cold tap water and are allowed to air dry.

Thus, it will be seen from the foregoing that there is provided an inexpensive and simple unit which is easy to operate and not subject to leaking of fluid. The lens may be transferred and used in the same holder or lid without a contact of the lens by the hands.

While a preferred embodiment has been shown and described, it will be understood that there is no intent to limit the invention by such disclosure but, rather, it is intended to cover all modifications and alternate constructions falling within the spirit and scope of the invention as defined in the appended claims.

We claim:

1. An assembly for use in caring for contact lens comprising a container having an opening and a hollow chamber for receiving a liquid therein, a lid for covering said container opening, a mechanical agitator supported for agitating movement within said container, perforated baskets suspended from a surface of said lid for holding said lenses in position for contact with said liquid, and cap means covering said baskets.

2. An assembly in accordance with claim 1 including another chamber for holding another liquid for soaking said contact lens and means on said another container for sealing engagement with said lid whereby said lid may be used interchangeably with said containers.

3. A cleaning unit for an article comprising a base, a motor drive means in said base, a container mounted on said base defining a hollow chamber for receiving a cleaning solution, said container having an upper opening leading to said chamber, a mechanical agitator rotatably mounted in said container and driven by said motor drive means for agitating said liquid in said chamber, a holder for said article having means for releasably connecting said holder on said container and in position covering said container opening, said holder having an access opening on the exterior side thereof permitting access to the article held thereby, and cap means for covering said access opening during a cleaning operation.

4. A cleaning unit in accordance with claim 3 in which said holder includes perforated baskets suspended from said holder at spaced positions thereon, and in which said cap means comprises a cap having an access opening therein is rotatably mounted for movement between access positions in which said access opening in said cap is aligned with one of said baskets to permit removal or placement of a lens in said aligned basket and a covering position in which imperforate portions of said cap cover said access openings.

5. A contact lens cleaning unit comprising a base, motor means in said base, a container mounted on said base defining a hollow chamber for receiving a cleaning solution, a mechanical agitator supported within said container, means for coupling said motor means and said agitator for rotation thereof, a lens holder for receiving and supporting a contact lens, openings in said lens holder for passage of the cleaning solution through said lens holder and into contact with a lens disposed therein, means for supporting said holder within said container, said lens holder including a lid and perforated baskets suspended from said lid, said lens holder having access openings therein providing access to said lens in said perforated baskets, and a cap means positionable on said lid in a first position to cover said openings and positionable in a second position to allow access to said lenses through said openings from the outside of said chamber.

6. A contact lens cleaning unit in accordance with claim 5 in which said container is a substantially cylindrical body having an open top and in which indicia means is provided on said cylindrical to indicate a desired liquid level.

7. A contact lens cleaning unit comprising a base, motor means in said base, a container mounted on said base defining a hollow chamber for receiving a cleaning solution, a mechanical agitator supported within said container, means for coupling said motor means and said agitator for rotation thereof, a lens holder for receiving and supporting a contact lens, openings in said lens holder for passage of the cleaning solution through said lens holder and into contact with a lens disposed therein, means for supporting said holder within said container, means providing a separate soaking chamber for holding a soaking liquid and for receiving said lens holder, and means on said soaking chamber means for engaging and supporting the lens holder to permit said lenses to be soaked in said soaking liquid.

References Cited

UNITED STATES PATENTS

| 3,132,657 | 5/1964 | Ciccone | 134—188 |
| 3,168,294 | 2/1965 | Hasumura | 259—108 |
| 3,265,369 | 8/1966 | Harrison | 134—188 X |
| 3,279,482 | 10/1966 | Hungerford et al. | 206—5 A |
| 3,421,528 | 1/1969 | Gomez et al. | 134—188 |

DAVE W. AROLA, Primary Examiner

U.S. Cl. X.R.

206—5; 259—108

UNITED STATES PATENT OFFICE
CERTIFICATE OF CORRECTION

Patent No. 3,614,959                Dated October 26, 1971

Inventor(s) Edgar H. Schollmaier et al

It is certified that error appears in the above-identified patent and that said Letters Patent are hereby corrected as shown below:

Column 4, line 39, "and" should be --an--

Column 7, line 30, "become" should be --becomes--

Claim 6, Column 8, line 43, after "cylindrical" insert --body--

Signed and sealed this 25th day of April 1972.

(SEAL)
Attest:

EDWARD M. FLETCHER, JR.                ROBERT GOTTSCHALK
Attesting Officer                      Commissioner of Patents